United States Patent
Kruka et al.

[15] 3,687,148
[45] Aug. 29, 1972

[54] PROCESS OF REDUCING FRICTION LOSS IN FLOWING HYDROCARBON LIQUIDS AND COMPOSITIONS THEREOF

[72] Inventors: Vitold Kruka, 12714 Cobblestone, Houston, Tex. 77024; Dale J. Meier, 708 Baera Dr., El Cerrito, Calif. 94530

[22] Filed: June 25, 1971

[21] Appl. No.: 156,920

Related U.S. Application Data

[63] Continuation-in-part of Ser. No. 5,156, Jan. 22, 1970, abandoned.

[52] U.S. Cl. ............... 137/13, 208/370, 260/33.6 A, 260/33.6 AQ, 260/33.6 PQ, 260/33.6 UA, 260/876 B, 260/878, 260/879, 260/880 B
[51] Int. Cl. ................................................ E17d 1/16
[58] Field of Search ...... 260/33.6 A, 876 B, 33.6 AQ, 260/33.6 UA, 33.6 PQ; 137/13; 208/370

[56] References Cited

UNITED STATES PATENTS

| | | |
|---|---|---|
| 2,492,173 | 12/1040 | Mysels .................... 137/13 |
| 3,215,154 | 11/1965 | White et al. ............. 137/13 |
| 3,238,173 | 3/1966 | Bailey et al. ............ 260/880 B |

*Primary Examiner*—Morris Liebman
*Assistant Examiner*—H. H. Fletcher
*Attorney*—Fredrik Marlowe et al.

[57] ABSTRACT

The disclosure describes a method of reducing friction during turbulent flow of non-aqueous liquids through conduits by addition to the fluids of from 1 to 2,000 ppm of a novel block polymer comprising chains of a block polymer having the formula A-B wherein A is a high molecular weight polymer block soluble in the hydrocarbon liquid and B is a low molecular weight polymer block substantially less soluble in the fluid.

10 Claims, No Drawings

3,687,148

PROCESS OF REDUCING FRICTION LOSS IN FLOWING HYDROCARBON LIQUIDS AND COMPOSITIONS THEREOF

REFERENCE TO RELATED APPLICATION

This application is a continuation-in-part of application serial No. 5156, filed Jan. 22, 1970, and now abandoned.

This invention relates to a method of decreasing frictional losses in flowing non-aqueous liquids through conduits, generally over great distances, but also over shorter distances such as in well-treating processes. More particularly, the invention is directed to the addition of a special class of block copolymers to non-aqueous liquids such as crude oil and fractions thereof so as to reduce their friction loss due to flow through pipelines over great and short distances as well as to the novel compositions of liquid and block polymers dispersed therein.

BACKGROUND OF THE INVENTION

It is well known in the art that frictional losses occurring in the transportation of hydrocarbon liquids ranging in viscosity from about that of gasoline to that of crude oil through pipelines or other conduits under turbulent flow contribute greatly to pumping costs due to increasing energy requirements necessary to overcome this phenomenon. Frictional losses become apparent as a pressure drop in the pipeline as the hydrocarbon liquids are pumped through it.

To reduce friction and overcome the undesired effects mentioned above, various means have been tried such as coating of the pipe walls with friction reducing materials or by addition of friction reducing chemical agents to the transported liquid. However, these means of reducing friction have met with little success because of the high cost of either coating the pipe walls or that of the friction reducing chemical agents which must be added in substantial quantities. Also, the additives are relatively difficult to disperse in the non-aqueous liquid.

It has also been attempted to employ polymer additives to reduce friction during flow of hydrocarbons through conduits. One difficulty, other than solubility problems, which hampers such use is the shear degradation or scission of the polymer chains which occurs under turbulent flow conditions. Friction reduction decreases with polymer chain scission because the amount of friction reduction in a given flow depends strongly on the size of the polymer or polymer agglomerate. Thus without repeated injection of prior art polymers substantial friction reduction can only be obtained in the initial portion of a long pipeline. The present invention not only provides for a high degree of dispersibility of polymer in the non-aqueous liquid but also overcomes this undesirable effect of shear degradation. While not restricting the present invention to any one theoretical basis, it is hypothesized that this is effected by reconstructing the required size polymer through reassociation of polymer chains once any scission has taken place. Reassociation to form large agglomerates is affected by the affinity of the relatively insoluble blocks for each other and the high diffusivity inherent in turbulent flow which will bring the individual chains into the neighborhood of one another or of agglomerates. Notwithstanding the foregoing, it should be understood that while the above theory is thought to explain the unexpected results found, the invention disclosed is not to be considered bound to any specific theoretical explanation.

SUMMARY OF THE INVENTION

The present invention is thus directed towards a method of reducing friction during the flow of non-aqueous liquids through conduits comprising adding to the liquid hydrocarbon a friction-reducing amount of a highly dispersible polymer which exhibits minimal effects of shear degradation consisting of chains of a block polymer having the general formula A-B wherein A is a polymer block having an average molecular weight between about 50,000 and 20,000,000 or preferably 50,000 and 10,000,000 or more preferably 50,000 and 5,000,000 or most preferably from 200,000 to 5,000,000 and soluble in the liquid and B is a polymer block having an average molecular weight between about 500 and 500,000 or preferably 500 and 200,000 or more preferably 500 and 50,000 or most preferably from 5,000 to 100,000, substantially less soluble (preferably substantially insoluble) in the liquid.

The present invention may also be described as a novel composition comprising the non-aqueous liquid having dispersed therein a polymer of the above description.

The block polymer may be used in concentrations ranging from about 1 to 2,000 ppm (parts by weight of polymer per million parts of liquid) and preferably from 10 to 500 ppm based on the liquid, which is preferably a hydrocarbon, such as petroleum crude, fractions thereof, liquified natural gas or mixtures thereof. The block copolymers may be prepared from a wide variety of monomers. Conjugated dienes, for example, which may be used in the preparation of the copolymers contain from four to 12 or four to 16 carbon atoms per molecule and preferably the following: 1,-butadiene, isoprene, 2,3-dimethyl-1,3-butadiene, 1,3-pentadiene (piperylene), 3-methyl-1,3-pentadiene, 1,3-heptadiene, 3-butyl-1,3-octadiene, phenyl-1,3-butadiene and the like. Conjugated dienes containing halogen and alkoxy substituents along the chain can also be employed such as chloroprene, fluoroprene, 2-methoxy-1,3-butadiene, 2-ethoxy-3-ethyl-1,3-butadiene, and 3-ethoxy-3-methyl-1,3-hexadiene. Preferred conjugated diolefins to be employed in the present invention are butadiene, isoprene, and piperylene. Alpha-mono-olefin polymers may also be used; an example of monomers from which such polymers may be prepared is polyisobutylene. Other polymers which may be used include long chain alkyl acrylates and alkylmethacrylates.

Copolymerizable monomers which may be used in the present invention include maleic acids such as maleic anhydrides, vinylpyridines and vinylquinolines in which the vinyl group is attached to a ring carbon other than a carbon in the beta position with respect to the nitrogen. These pyridine, quinoline or isoquinoline derivatives can contain substituents such as alkyl, cycloalkyl, aryl, alkaryl, aralkyl, alkoxy, aryloxy, and dialkylamino groups in which the total number of carbon atoms in the combined substituents does not exceed 12. Any alkyl groups on the alpha or gamma carbons with respect to the nitrogen should be tertiary alkyl groups. Examples of monomers applicable include: 2-vinylpyridine, 3,5-diethyl-4-vinylpyridine, 3-n-dodecyl-2-vinyl-pyridine, 5-cyclohexyl-2-vinylpyridine, 4-phenyl-2-vinylpyridine, 3-benzyl-4-vinyl-pyridine, 6-methoxy-2-vinylpyridine, 4-phenoxy-2-vinylpyridine, 4-dimethyl-amino-2-vinylpyridine-2-vinylquinoline, 3-methyl-4-ethoxy-2-vinylquinoline, 3-vinylisoquinoline, 4-phenyl-1-vinylisoquinoline and the like. Other polar monomers include acrylic and alkyacrylic acid esters, nitriles, and N,N-di- substituted amides, such as methyl acrylate, ethyl acrylate, butyl acrylate, methyl methacrylate, ethyl methacrylate, propyl methacrylate, butyl methacrylate, methyl ethacrylate, ethyl ethacrylate, isopropyl ethacrylate, acrylonitrile, methacrylonitrile, N,N-dimethacrylamide, N,N-diethylmethacrylamide and the like. Vinylfuran and N-vinylcarbazole can also be used. Other monomers which may be used in the present invention are monovinyl arenes such as, for example, styrene and vinyl toluene and other ring substituted styrenes such as alkoxy styrenes (e.g., methoxy styrene) alkyl styrene (e.g., ethyl or diethyl styrene) and as well as haloarenes, particularly halostyrenes (e.g., 2,5-dichlorostyrene). The preferred monomer to be employed in the present invention is styrene.

The block copolymers having the above solubility relationships are preferably selected from the following block types:

a. Conjugated diene polymers.
b. Hydrogenated derivatives of the same.
c. Alpha-mono-olefin polymers and copolymers.
d. Monovinyl arenes copolymerized with conjugated dienes.
e. Hydrogenated derivatives of the same.
f. Monovinyl arenes.
g. Hydrogenated derivatives of the same.
h. Grafted blocks of one type of monomer on the backbone of the second type of polymer block.
i. "Derivatized" block polymers, wherein polymers of the above types have been selectively or randomly treated to form hydroxyl, carboxyl, sulfonic, amido, amino, etc., derivatives in one or both types of blocks, as well as metal salts of the same.

Hydrogenated derivatives would be of special utility due not only to their altered solubility characteristics, but also their enhanced thermal and oxidative stability. Hydrogenation may be selective, complete, or random. Thus complete hydrogenation of a relatively high cis polybutadiene-polyisoprene block polymer, for example, gives a derivative closely resembling polyethylene-(ethylene-propylene copolymer). Mono-alpha olefins may be block copolymerized to form, for example, polyethylene-EPR or a block polymer having two random copolymer blocks, having different ratios of monomers chosen to give one soluble and one insoluble block, in the non-aqueous medium being so modified. One, or both mono-alpha olefin blocks can be modified by another type of copolymerizable monomer, such as a conjugated diene.

Block copolymers of monovinyl arenes and conjugated dienes are typified by polystyrene-polybutadiene and polystyrene-polyisoprene. However, either one or both of the individual blocks may be randomly copolymerized with a minor (by weight) amount of the other type of monomer. Thus, a typical species is polystyrene-(styrene-butadiene copolymer). These may be hydrogenated to alter their individual block solubility characteristics as well as to improve their oxidative stability. The hydrogenation may be selective, such as the hydrogenation of polystyrene-polyisoprene to form polystyrene—EPR, or it may be complete, as in the further hydrogenation of the same block polymer to form polyvinylcyclohexane–EPR. Incomplete non-selective hydrogenation may be used if desirable for a specific situation.

While end-to-end block copolymers are generally contemplated, it is within the scope of the present invention to utilize grafted block copolymer wherein the terminal end of one polymer block is grafted to a non-terminal carbon atom of the second polymer block. Furthermore, any of the above types of block copolymers can be derivatized to alter their solubility characteristics or their surface active properties. Thus substituents may be either terminal groups or positioned along the copolymer chain in either or both polymer blocks. The proportion of such non-hydrocarbon substituents will vary with the intended function. Such substituents as sulfonic acid, carboxyl, hydroxyl, sulfhydryl, amido, amino, epoxy, cyano, phosphino, aziridinyl, etc. groups may be present.

While the method of preparation of the subject conjugated diene block polymers forms no part of the present invention, they may be prepared for the most part by conventional methods. A preferred process to be used in the present invention is the so-called "sequential" process which may be described, by way of illustration, as follows: A conjugated diene hydrocarbon such as butadiene is subjected to solution polymerization in the presence of a lithium based catalyst, such as lithium alkyl. Polymerization is conducted to the point where the first polymer block is formed, after which, without termination of the growing polymer chains, a copolymerizable monomer such as styrene is injected and polymerization is continued. In the sequential process, polymerization is conducted until the desired molecular weight of the entire second block is formed. The products obtained having the general configuration A-B, wherein A is an essentially unbranched polymer block of a conjugated diene (in this case, polybutadiene) while B is a polymer block of a copolymerizable monomer (in this case, polystyrene). By "essentially unbranched" is meant a polymer block which does not contain regularly spaced or regularly oriented hydrocarbon substituents pendant from the backbone of the polymer chain.

The block polymers so obtained can be substantially hydrogenated so that at least about 90 percent of the double bonds in the original block copolymer and preferably in excess of about 95 percent are hydrogenated.

The type of catalyst employed for the production of alpha olefin block copolymers is of some importance in obtaining the optimum properties desired for such compositions. The usual Ziegler catalysts, such as titanium halides and the like may be employed for this purpose together with aluminum halides or aluminum organo halides. It is preferred to use 5–1,500 millimoles of titanium and 10–5,000 millimoles of aluminum per liter of total reaction mixture. The preferred types of catalyst are the vanadium based polymerization catalysts used in conjunction with aluminum-containing reducing agents. Preferred among these are three general classes of vanadium compounds, namely, those based upon vanadium alkoxides, vanadium salts of salicylic acids and vanadium salts of sulfonic acids. The molecular ratio in which the catalyst components are present has a powerful influence upon both the rate and yield of the polymerization and on the properties of the polymer. In general, the number of atoms of vanadium and the number of aluminum atoms are in a ratio varying from about 0.51:1 and 2:1. In general, the highest yields and most desirable molecular weights are obtained when this ratio is between about 0.05:100 millimoles of vanadium and 0.5–50 millimoles of aluminum per liter of reaction mixture.

Another type of synthesis comprises the polymerization of a polymer block A bearing a functional group, e.g., carboxyl and a second polymer block B bearing a functional group reactive with that of block A, e.g., hydroxyl, and reacting the two to form a block copolymer with an insignificant linkage, e.g., ester, resulting from the reaction.

The block copolymerization is conducted in the presence of a solvent (e.g., hydrocarbon) which is essentially inert under the conditions of the polymerization. Alkanes and cycloalkanes such as hexane, cyclohexane, heptane, or other saturated hydrocarbons having from four to ten carbon atoms per molecule are preferred solvents for this purpose. Aromatic solvents, benzene, toluene, etc., also can be used as well as some chlorinated alkanes and cycloalkanes. These solvents may be modified by the additional presence of 0.5–10 percent by weight of a chlorocarbon such as carbon tetrachloride.

The polymerization is to be conducted under conditions which will avoid inadvertent termination of the growing polymer chain. This temperature range is usually between about −25° C and 100° C the preferred range being between about −15° C and 75° C.

To illustrate the manner in which the invention may be carried out, the following examples are given. It is to be understood, however, that the examples are for the purpose of illustration and the invention is not to be regarded as limited to any of the specific conditions cited therein.

EXAMPLE I

Preparation of Butadiene - Styrene Block Polymer

30 Parts styrene was subjected to solution polymerization in 800 parts cyclohexane containing 0.00037 mols butyl lithium polymerization catalyst. The reaction was run at 50° C until all of the styrene had polymerized, (about 1–½ hours). Then 251 parts butadiene in 2,000 parts cyclohexane was injected and polymerization continued for about 3–½ hours at 60° C until all of the butadiene had polymerized. The resulting block polymer had molecular weights as follows: Polystyrene block, about 24,000; polybutadiene block, about 715,000.

EXAMPLE II

A block polymer is prepared from butadiene and methylmethacrylate in the manner disclosed in Example I. The final block polymer has the configuration polybutadiene-polymethylmethacrylate, the average molecular weight of the polybutadiene polymer block being about 500,000 and the average molecular weight of the polymethylmethacrylate polymer block being about 30,000.

EXAMPLE III

Hydrogenation of Conjugated Diene Block Copolymers

Hydrogenation of the polymer prepared according to Example II is effected in the presence of a catalyst prepared by contacting nickel acetate with aluminum triethyl, in a molar ratio of 1.5:1, aluminum:nickel. The catalyst components are heated in cyclohexane for 30 minutes at 130° C. An amount of catalyst sufficient to provide one percent by weight of reduced nickel based on the polymer is suspended in a cyclohexane solution of the polymer, the solution containing 14 percent by weight of the latter. The reactor is pressured to 1,500 psig with hydrogen and heated to a maximum of 140° C polymer, the solution containing 14 percent by weight of the latter. The reactor is pressured to 1,500 psig with hydrogen and heated to a maximum of 140° C with vigorous stirring. The total reaction time is 140 minutes (120 minutes above 130°. Absorption of hydrogen takes place immediately and is probably completed within 30 minutes. The final reaction pressure at 140°C is 1,120 psig. The product is essentially completely hydrogenated and has the configuration polyethylene-polymethylmethacrylate.

EXAMPLE IV

Example I is repeated except ethylene oxide is used as the copolymerizable monomer instead of styrene. A block polymer having the structure polybutadiene-polyethylene oxide is produced wherein the polyethylene oxide block has an average molecular weight of 2,000.

EXAMPLE V

The composition of Example I was tested and compared with a polyisobutylene sample of an approximately equivalent molecular weight. Both samples were tested at a concentration of 268 ppm in cyclohexane. The test system consists of a 4-foot long 0.143-inch I.D. glass tube with pressure taps located 7 inches apart in the fully developed portion of the flow. The sample solution is circulated through the system by means of two 5-inch diameter pistons at the opposing ends of the glass tube. This method of pumping the solutions eliminates shear degradation of the polymers which takes place in conventional pumps.

The solutions were recirculated through the flow system at a wall shear stress of 5600 dynes/cm². The wall shear stress is given by $$\tau_w = \frac{D}{4} \frac{dp}{dx}$$

where D is the pipe diameter and $dp/dx$ the pressure gradient. The results, shown in Table I, are reported in terms of percent friction reduction and number of passes through the system. The percent friction reduction is given by $$F = 100 \times (f_N - f)/f_N$$

where $f_N$ and $f$ are the solvent and solution friction factors respectively and read as $$f = \frac{D}{4}\frac{dp}{dx}\bigg/\frac{1}{2}\rho\bar{U}^2$$

where $p$ and $\bar{U}$ are the density and bulk velocity.

TABLE I

Percent Friction Reduction

| Number of Passes | 268 ppm Styrene-Butadiene Cyclohexane Solution | Hexadecane Solution | 268 ppm Polyisobutylene cyclohexane Solution | Hexadecane Solution |
|---|---|---|---|---|
| 1 | 70.5 | 79.0 | 48.4 | 53.9 |
| 10 | 56.9 | 64.7 | 39.6 | 40.7 |
| 20 | 52.8 | 53.4 | 34.7 | 29.1 |
| 50 | 48.5 | 41.0 | 29.0 | 24.9 |
| 100 | 41.4 | 33.0 | 24.0 | 20.5 |
| 200 | 38.5 | 26.0 | 19.2 | 15.8 |
| 300 | 37.6 | 22.1 | 17.7 | 11.8 |
| 400 | 37.2 | 19.3 | 16.8 | 10.8 |
| 500 | 36.4 | 17.2 | 15.5 | 8.8 |
| 600 | 35.2 | 18.1 | 14.7 | 9.4 |
| 700 | 34.9 | 16.1 | 14.7 | 9.2 |

As can be seen, the styrene-butadiene block copolymer is more effective in reducing frictional losses than polyisobutylene. The initial degrees of friction reduction for the styrene-butadiene and polyisobutylene are 70.5 percent and 48.4 percent respectively. Further, the styrene-butadiene block copolymer maintains its ability to reduce friction better than polyisobutylene. After 700 passes through the system the two solutions yield friction reductions of 34.9 percent and 14.7 percent. That is, the styrene-butadine has lost 50.5 percent of its initial friction reducing capability while the polyisobutylene displays a loss of 69.7 percent.

The degree of friction reduction is strongly dependent on the effective size of the polymer molecule or polymer agglomerate. This dependence manifests itself in the onset conditions for friction reduction. Usually the onset condition is expressed in terms of a critical wall shear stress, $\approx_{w/cr}$. This critical wall shear stress decreases with increasing polymer size. Friction reduction can be obtained only if the wall shear stress existing in any given flow exceeds the critical wall sheer stress. Thus it is desirable to have large polymers and low critical wall shears. The onset conditions for conventional polymers are independent of polymer concentration. The styrene-butadiene block copolymer, on the other hand, displays a lower critical wall shear stress with increased concentration. Table II serves to demonstrate this behavior:

TABLE II

| Polymer | mol. wt. x $10^{-6}$ | Solvent | Concentration (ppm) | Critical Wall Shear Stress dynes/cm² |
|---|---|---|---|---|
| Styrene-Butadiene Block Copolymer | 0.74 | West Texas Crude Oil | 268 | 1430 |
| | | | 347 | 570 |
| | | Hexadecane | 268 | 630 |
| | | | 155 | 337 |
| Polyisobutylene | 0.80 | West Texas Crude Oil | 268 | 590 |
| | | | 347 | 630 |
| Polyisobutylene | 0.80 | Cyclohexane | 268 | 370 |
| | | | 357 | 380 |
| Styrene-Butadiene Block Copolymer | 0.34 | Hexadecane | 250 | 2190 |
| | | | 500 | 410 |

The benefit gained by the use of the present invention lies in the substantial friction reducing ability during turbulent high speed or high pressure flow through pipelines, and the maintenance of this ability over a long period even though subject to high shear conditions. As stated hereinbefore, ordinary polymers, such as polyisobutylene and the like exhibit more catastrophic chain scission under similar conditions.

While the precise reason for the outstanding performance of the present tow-block copolymers has not been completely elucidated, it is believed to be due in major part to the phenomena referred to earlier: The relatively high molecular weight block, being miscible with the non-aqueous liquid, enables the polymer to be dispersed in the liquid. The relatively low molecular weight block, being substantially less soluble (or even insoluble) in the liquid, tends to associate with similar blocks from other polymer chains, thus forming domains, variously referred to as aggregates or agglomerates. The forces holding such domains together are physical rather than chemical; and, upon stress due to high shear at the pipe wall, the domains may disintegrate. However, at a later point downstream when the polymer may be in a position or environment of reduced shear, the domains may reform and the function of the polymer as a friction reducing agent is reestablished. Normal high molecular weight polymers such as polyisobutylene, for example, exhibit the cleavage of chemical bonds under conditions of high shear. Such cleavage is irreversible and consequently effectiveness of such polymers as friction reducing agents decrease at a rate relative to the ability of the polymer to shear degradation.

The primary types of utility of the present invention are in pipeline transportation of non-aqueous fluids from one geographical location to another and in injection of drilling fluids or oil well treating fluids. The first of these involves relatively horizontal pipelines, conforming to landscape contours, and passage of the liquids, e.g., liquid or liquified hydrocarbons, through pumping stations to terminals such as shipping facilities, tankers, refineries, etc. the reduction in friction-caused pressure loss is an important economic factor in such situations.

The use of the invention in oil-based drilling fluids and well treating fluids (a relatively vertical tubing being involved) also is of substantial benefit since high pressure and turbulent flows are involved.

We claim as our invention:

1. A process for reducing fluid flow friction loss in the transfer of a non-aqueous liquid medium through a pipe at high velocity which comprises intermixing with the fluid from 0.0001 to 0.2 weight percent of a two block copolymer wherein a block A is substantially soluble in the liquid medium and has an average molecular weight between about $5 \times 10^4$ and $2 \times 10^7$, and a block B is substantially less soluble in the liquid and has an average molecular weight between about $5 \times 10^2$ and $5 \times 10^5$ and transferring the intermixed fluid and copolymer through a pipe at high velocity.

2. A process according to claim 1, wherein the transfer occurs in an essentially horizontal pipe.

3. A process according to claim 1 wherein the transfer occurs in an essentially vertical pipe.

4. A process according to claim 1 wherein the fluid is a hydrocarbon and the block B predominates in polymerized monovinyl arene units and the block A predominates in polymerized conjugated diene units.

5. A process according to claim 1 wherein the fluid is a hydrocarbon and the block B comprises an alpha olefin homopolymer block and the block A comprises a copolymer block of at least two alpha olefins.

6. A process according to claim 1 wherein the fluid is a hydrocarbon and the block A is a hydrogenated polyisoprene block and block B is a hydrogenated polybutadiene block.

7. A process according to claim 1 wherein the fluid is a hydrocarbon and the block B is a polystyrene block and block A is a polybutadiene block.

8. A process according to claim 1 wherein the block B is substantially insoluble in the non-aqueous liquid medium.

9. A process according to claim 1 wherein block B is a polymaleic acid block and block A is a polybutadiene block.

10. A process according to claim 1 wherein block B is a vinylpyridine block and block A is a polybutadiene block.

* * * * *

PO-1050
(5/69)

P-3510G (US)
FM:nsn

UNITED STATES PATENT OFFICE
CERTIFICATE OF CORRECTION

Patent No. 3,687,148        Dated August 29, 1972

Inventor(s) VITOLD R. KRUKA and DALE J. MEIER

It is certified that error appears in the above-identified patent and that said Letters Patent are hereby corrected as shown below:

The patent is assigned to Shell Oil Company, New York, New York, a Corporation of Delaware.

Signed and sealed this 6th day of February 1973.

(SEAL)
Attest:

EDWARD M. FLETCHER, JR.
Attesting Officer

ROBERT GOTTSCHALK
Commissioner of Patents